(12) United States Patent
Donahue et al.

(10) Patent No.: US 10,600,124 B2
(45) Date of Patent: Mar. 24, 2020

(54) HYBRID ELECTRONIC RECORD ORDERING SYSTEM

(71) Applicant: Hartford Fire Insurance Company, Hartford, CT (US)

(72) Inventors: Stephen J Donahue, Andover, CT (US); Tammy D Hamilton, Southington, CT (US); Paul Brendan Olson, Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 952 days.

(21) Appl. No.: 14/863,559

(22) Filed: Sep. 24, 2015

(65) Prior Publication Data

US 2017/0091866 A1  Mar. 30, 2017

(51) Int. Cl.
| | | |
|---|---|---|
| G06Q 40/00 | (2012.01) | |
| G06Q 40/08 | (2012.01) | |
| H04L 29/08 | (2006.01) | |
| G06Q 50/26 | (2012.01) | |

(52) U.S. Cl.
CPC ............. *G06Q 40/08* (2013.01); *G06Q 50/26* (2013.01); *H04L 67/10* (2013.01); *H04L 67/20* (2013.01)

(58) Field of Classification Search
USPC ............... 705/4, 39, 38, 37, 26; 235/380; 395/925; 717/170
See application file for complete search history.

(56) References Cited

U.S. PATENT DOCUMENTS

| | | | |
|---|---|---|---|
| 4,831,526 A | 5/1989 | Luchs et al. | |
| 5,809,478 A * | 9/1998 | Greco | G06Q 40/08 705/4 |
| 7,322,030 B1 * | 1/2008 | Boodro | G06F 8/36 717/170 |
| 8,145,507 B2 * | 3/2012 | Zizzamia | G06Q 10/0635 705/4 |
| 8,554,584 B2 | 10/2013 | Hargroder | |
| 9,870,609 B2 * | 1/2018 | Kompalli | G06T 7/0002 |
| 2002/0091550 A1 | 7/2002 | White et al. | |
| 2002/0111835 A1 | 8/2002 | Hele et al. | |
| 2006/0095304 A1 * | 5/2006 | Madison | G06Q 40/08 705/4 |

OTHER PUBLICATIONS

Xin Zhang, Tingting Zhang, Achieving scalability in a distributed electronic health record system, 2013 Science and Information Conference (pp. 68-77), Nov. 29, 2013. (Year: 2013).*

* cited by examiner

*Primary Examiner* — Tien C Nguyen
(74) *Attorney, Agent, or Firm* — Buckley, Maschoff & Talwalkar LLC

(57) ABSTRACT

An enterprise platform may receive information about a potential customer, the enterprise platform including an internal business Motor Vehicle Record ("MVR") model. A vendor hub service may be in communication with a plurality of third party vendor platforms, at least one including a third party MVR model. The enterprise platform may apply business rules and logic to determine that: (i) the internal business MVR model will decide if an MVR will be purchased from an appropriate department of motor vehicles, (ii) the third party MVR model will decide if an MVR will be purchased, or (iii) a hybrid application of the models will decide if an MVR will be purchased. An MVR report ordering platform may transmit an MVR report request to a service in accordance with the enterprise platform business rules and logic decision and applicable model results.

15 Claims, 13 Drawing Sheets

HYBRID ELECTRONIC RECORD ORDERING SYSTEM

FIELD

The present invention relates to computer systems and, more particularly, to computer systems using a hybrid electronic record ordering system.

BACKGROUND

An enterprise may order electronic records from a governmental agency. For example, when determining an appropriate pricing arrangement for a potential customer, the enterprise might order a Motor Vehicle Record ("MVR") from a state's Department of Motor Vehicles. In this way, the enterprise can determine if the potential customer has been cited for motor vehicle violations (e.g., driving too fast, failing to stop at a red light, etc.) and adjust the pricing arrangement as appropriate. Typically, a state Department of Motor Vehicles will charge a fee for providing this record, and this fee can vary from state to state. For example, one state might charge the insurance enterprise $10.00 for providing the MVR while another state charges $30.00.

In some cases, a third party service might also be able to provide some information about a potential customer's driving history. For example, a third party service might have access to publically available court documents that could be used to generate information about a potential customer's driving history. Moreover, the third party service might be able to provide such information to the enterprise at a lower cost as compared to a state's Department of Motor Vehicles. In other cases, it may not be necessary to obtain a driving history at all for a particular driver. Note that an enterprise might be processing thousands of potential customers on a weekly basis and ordering an MVR for each and every customer can be an expensive proposition (e.g., an enterprise could spend millions of dollars per year obtaining MVRs). Moreover, determining whether third party vendor information is available can be a time consuming process, especially when there are multiple parties that could potentially provide driving history information and there are a substantial number of potential customers being processed. It would therefore be desirable to provide systems and methods to facilitate electronic record ordering in an automated, efficient, secure, and accurate manner.

SUMMARY

According to some embodiments, systems, methods, apparatus, computer program code and means may facilitate electronic record ordering. In some embodiments, an enterprise platform may receive information about a potential customer, the enterprise platform including an internal business MVR model. A vendor hub service may be in communication with a plurality of third party vendor platforms, at least one including a third party MVR model. The enterprise platform may apply business rules and logic to determine that: (i) the internal business MVR model will decide if an MVR will be purchased from an appropriate department of motor vehicles, (ii) the third party MVR model will decide if an MVR will be purchased, or (iii) a hybrid application of the models will decide if an MVR will be purchased. AN MVR report ordering platform may transmit an MVR report request to a service in accordance with the enterprise platform business rules and logic decision and applicable model results.

Some embodiments provide: means for receiving, at an enterprise platform, information about a potential customer, the enterprise platform including an internal business Motor Vehicle Record ("MVR") model; means for applying, by the enterprise platform, business rules and logic, including a determination of a geographic state associated with the potential customer, to the information about the potential customer to determine one of: (i) that the internal business MVR model will decide if an MVR will be purchased from an appropriate department of motor vehicles, (ii) that the third party MVR model will decide if an MVR will be purchased from the appropriate department of motor vehicles, or (iii) that a hybrid application of the internal business MVR model and the third party MVR model will decide if an MVR will be purchased from the appropriate department of motor vehicles; means for arranging for a vendor hub service to communicate with a plurality of third party vendor platforms, at least one third party vendor platform including a third party MVR model; and means for automatically transmitting from an MVR report ordering platform an electronic MVR report request to a service in accordance with the enterprise platform business rules and logic decision and applicable model results, wherein the business rules and logic include a determination of a cost of ordering an MVR from the appropriate department of motor vehicles and a comparison of that cost to an algorithm generated predicted payback value for a plurality of drivers and a plurality of vehicles.

A technical effect of some embodiments of the invention is an improved, secure, and computerized method to order electronic records. With these and other advantages and features that will become hereinafter apparent, a more complete understanding of the nature of the invention can be obtained by referring to the following detailed description and to the drawings appended hereto.

DETAILED DESCRIPTION

An enterprise may order an electronic record, such as an MVR that contains a driver's driving history (e.g., associated with the driver's prior moving violations). An MVR may be, for example, ordered for each driver when the enterprising is determining a pricing arrangement for a customer. The MVRs may be ordered in substantially real-time, interactively, by a policy administration system directly from state Motor Vehicle Departments and/or via third party vendors. Note that the cost for an MVR may vary by state and can result in very high expenses for the enterprise. It would therefore be desirable to provide systems and methods to facilitate electronic record ordering in an automated, efficient, and accurate manner.

Note that the present invention provides significant technical improvements to facilitate an analysis of customer feedback information. The present invention is directed to more than merely a computer implementation of a routine or conventional activity previously known in the industry as it significantly advances the technical efficiency, access and/or accuracy of analysis of customer feedback information by implementing a specific new method and system as defined herein. The present invention is a specific advancement in the areas of electronic record ordering by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized enterprise, client and/or third party analysis systems, networks and subsystems. For example, in the present invention the transmission of substantial amounts of information may be avoided as unnecessary (and costly) by an enterprise.

Figure 1:
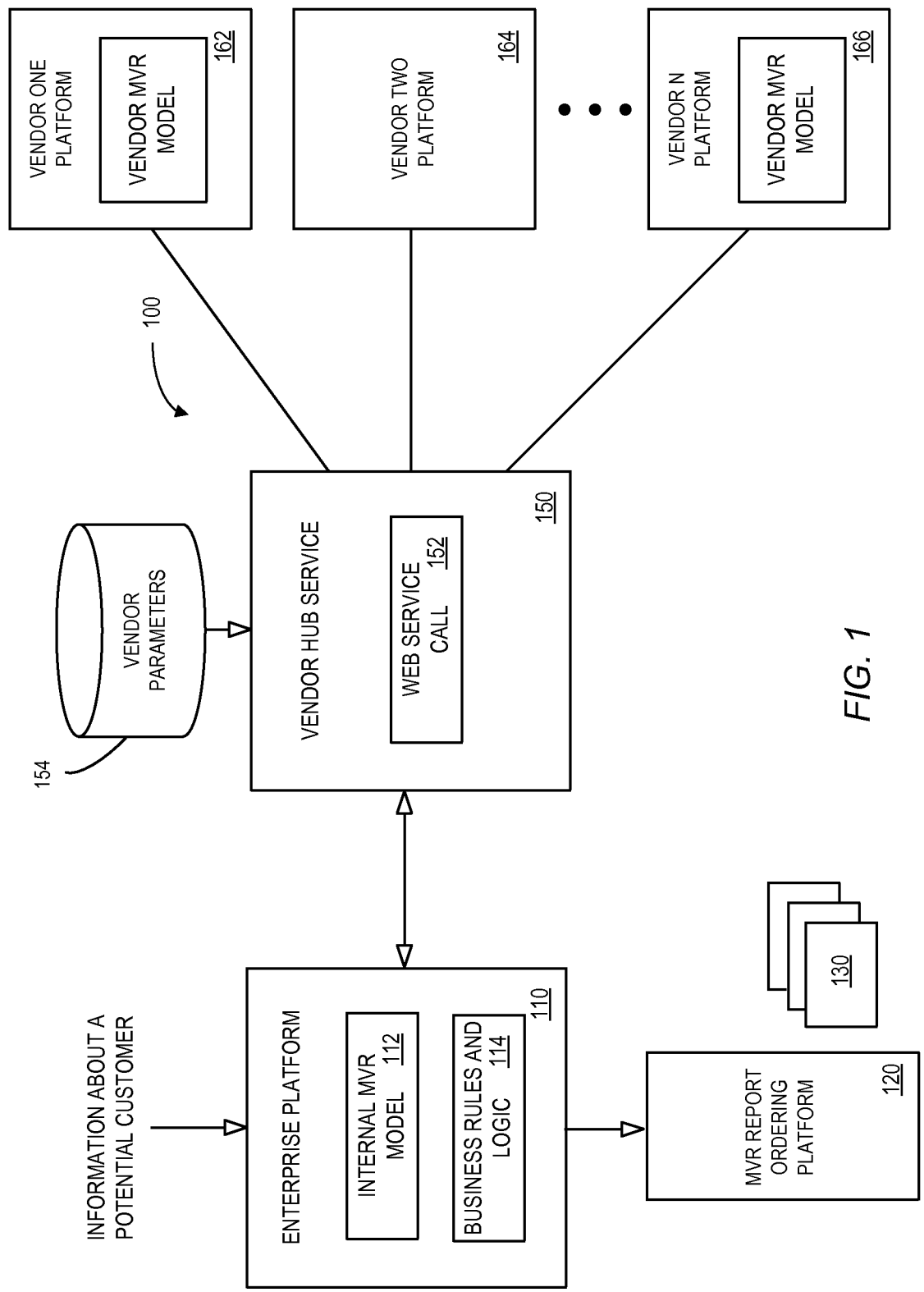
FIG. 1 is block diagram of a system according to some embodiments of the present invention.

FIG. 1 is block diagram of a system 100 according to some embodiments of the present invention. In particular, the system 100 includes an enterprise platform 110 that may receive information about a potential customer. The received information might come from a web page and/or a customer service representative terminal (e.g., a terminal used to field telephone calls from customers). The enterprise platform 110 may also communicate with an MVR report ordering platform 120 to obtain MVR reports 130.

According to some embodiments, the enterprise platform 110 communicates with a vendor hub service 150. The vendor hub service 150 may execute web service calls 152 in accordance with vendor parameters 154 to communicate with a vendor one platform 162, a vendor two platform 164, etc., up to and including a vendor n platform 166.

The enterprise platform 110 and/or other devices within the system 100 might be, for example, associated with a Personal Computer ("PC"), laptop computer, smartphone, an enterprise server, a server farm, and/or a database or similar storage devices. The enterprise platform 110 may, according to some embodiments, be associated with an enterprise that interacts with customers.

According to some embodiments, an "automated" enterprise platform 110 may facilitate the collection and analysis of information from potential customers. For example, the enterprise platform 110 may automatically trigger an MVR report from the ordering platform 120. As used herein, the term "automated" may refer to, for example, actions that can be performed with little (or no) intervention by a human.

As used herein, devices, including those associated with the enterprise platform 110 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The enterprise platform 110 may store information into and/or retrieve information from one or more databases. The databases might be associated with, for example, an enterprise and might also store data associated with past and current pricing arrangements with customers. The database may be locally stored or reside remote from the enterprise platform 110. As will be described further below, the database may be used by the enterprise platform 110 to facilitate interactions with customers. According to some embodiments, the enterprise platform 110 communicates information associated with customers to a remote insurance device and/or to an automated system, such as by transmitting an electronic file to a remote device, an email server, a workflow management system, a predictive model, a map application, etc.

Although a single enterprise platform 110 is shown in FIG. 1, any number of such devices may be included. Moreover, various devices described herein might be combined according to embodiments of the present invention. For example, in some embodiments, the enterprise platform 110 and vendor hub service 150 might be co-located and/or may comprise a single apparatus.

Figure 2:
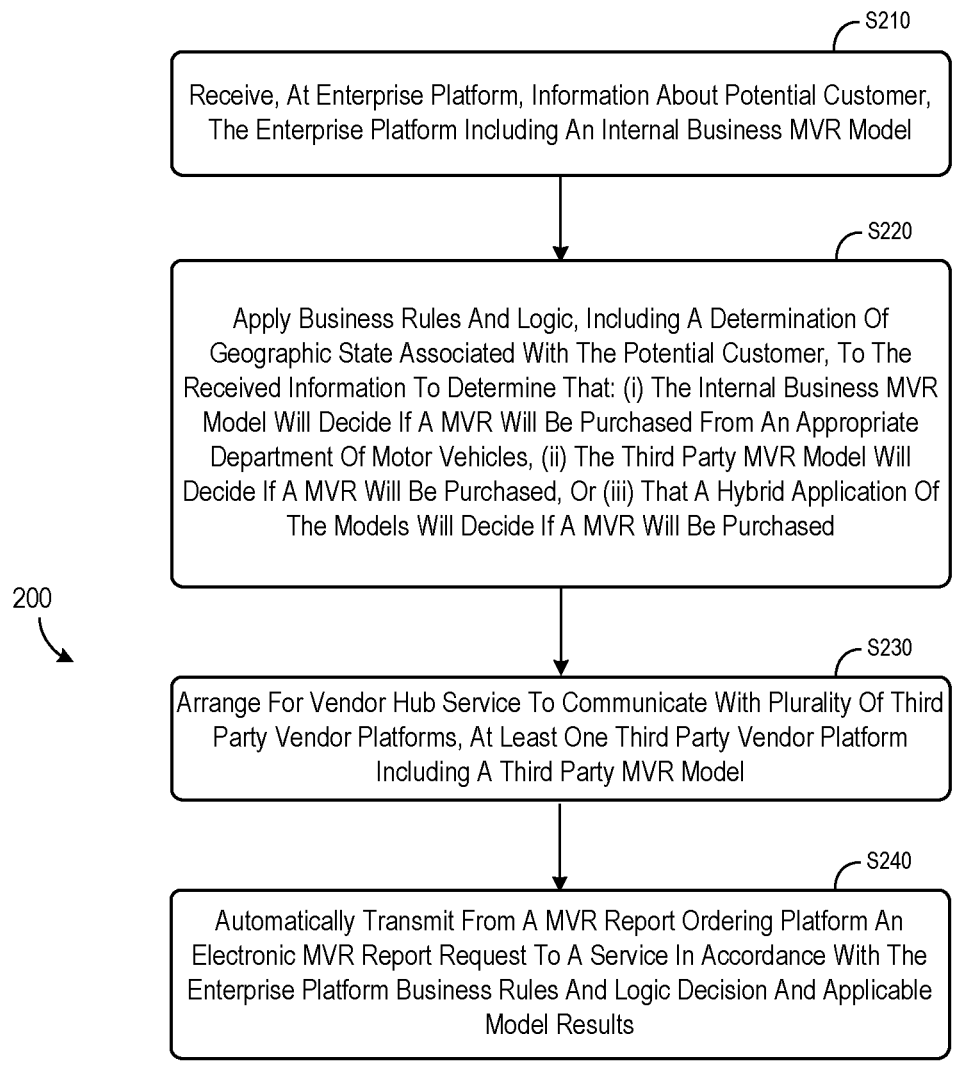
FIG. 2 illustrates a method that might be performed in accordance with some embodiments.

Note that the system 100 of FIG. 1 is provided only as an example, and embodiments may be associated with additional elements or components. According to some embodiments, the elements of the system facilitate the collection electronic records. For example, the enterprise platform 110 may include an internal MVR model 112 and/or business rules and/or logic 114 to facilitate the ordering of electronic records. Similarly, one or more of the third party vendor platforms 162, 164, 166 may include a vendor MVR model to facilitate the ordering of electronic records. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an enterprise platform may receive information about a potential customer. The enterprise platform may include, for example, an internal business MVR model. The information about the potential customer might include, for example, a driver gender, a driver age, an indication of whether the driver is a principle operator of a motor vehicle, a number of vehicles, a number of drivers, a marital status, an insurance score, a number of years licensed, and/or an indication of whether the driver is a student. Note that the information about the potential automobile customer might be associated with a pricing arrangement for a potential customer, a renewal of an existing pricing arrangement, etc.

At S220, the enterprise platform may apply business rules and logic, including a determination of a geographic state associated with the potential customer, to the information about the potential customer to determine one of:

that the internal business MVR model will decide if an MVR will be purchased from an appropriate department of motor vehicles, that a third party MVR model will decide if an MVR will be purchased from the appropriate department of motor vehicles, or that a hybrid application of the internal business MVR model and the third party MVR model will decide if an MVR will be purchased from the appropriate department of motor vehicles.

At S230, it may be arranged for a vendor hub service to communicate with a plurality of third party vendor platforms, at least one third party vendor platform including the third party MVR model.

At S240, an MVR report ordering platform may automatically transmit an electronic MVR report request to a service in accordance with the enterprise platform business rules and logic decision and applicable model results. Note that the business rules and logic may include a determination of a cost of ordering an MVR from the appropriate department of motor vehicles and a comparison of that cost to an algorithm generated predicted payback value for a plurality of drivers and a plurality of vehicles.

In this way, embodiments may help optimize a predictive business MVR model, taking advantage of vendor solutions that provide fact-based court violation information to help an enterprise order MVRs for drivers who have violation activity (thereby reducing MVR expense). Note that the enterprise may partner with one or more vendors who have broader driver violation activity data, reduce the need for maintenance of the internal MVR model, and take advantage of a vendor hub that can connect to various vendors and/or data at a relatively lower cost as compared to a single connection option. Moreover, such a hub may provide an ability to change vendors in future with relatively minimal work. Such an approach may use a business rules/model-driven approach to determine if the enterprise should order an MVR for a given driver based on characteristics of the pricing arrangement and the availability of fact-based court violation information. The models may, according to some embodiments, comprise a combination of internal (in-house) models and one or more third party vendor models.

Some embodiments may provide a solution that—at the point an insurance enterprise needs to order an MVR—executes a service that determines, for each driver, whether to use an in-house model, a vendor's model or a combination of both. When the vendor's model is utilized, the insurance enterprise may invoke a service call to the vendor to run that model via a third party vendor hub service. The results may then be passed through a business rules service to make a final decision for each driver as to whether an MVR should be ordered. Thus, some embodiments may use in-house models, a third party vendor hub service, a third party vendors model and/or a business rules service to make a decision, real-time, for each driver, as to whether the insurance enterprise should order an MVR at the point in time a policy is being rated (e.g., when underwriting decisions may be made).

Figure 3:
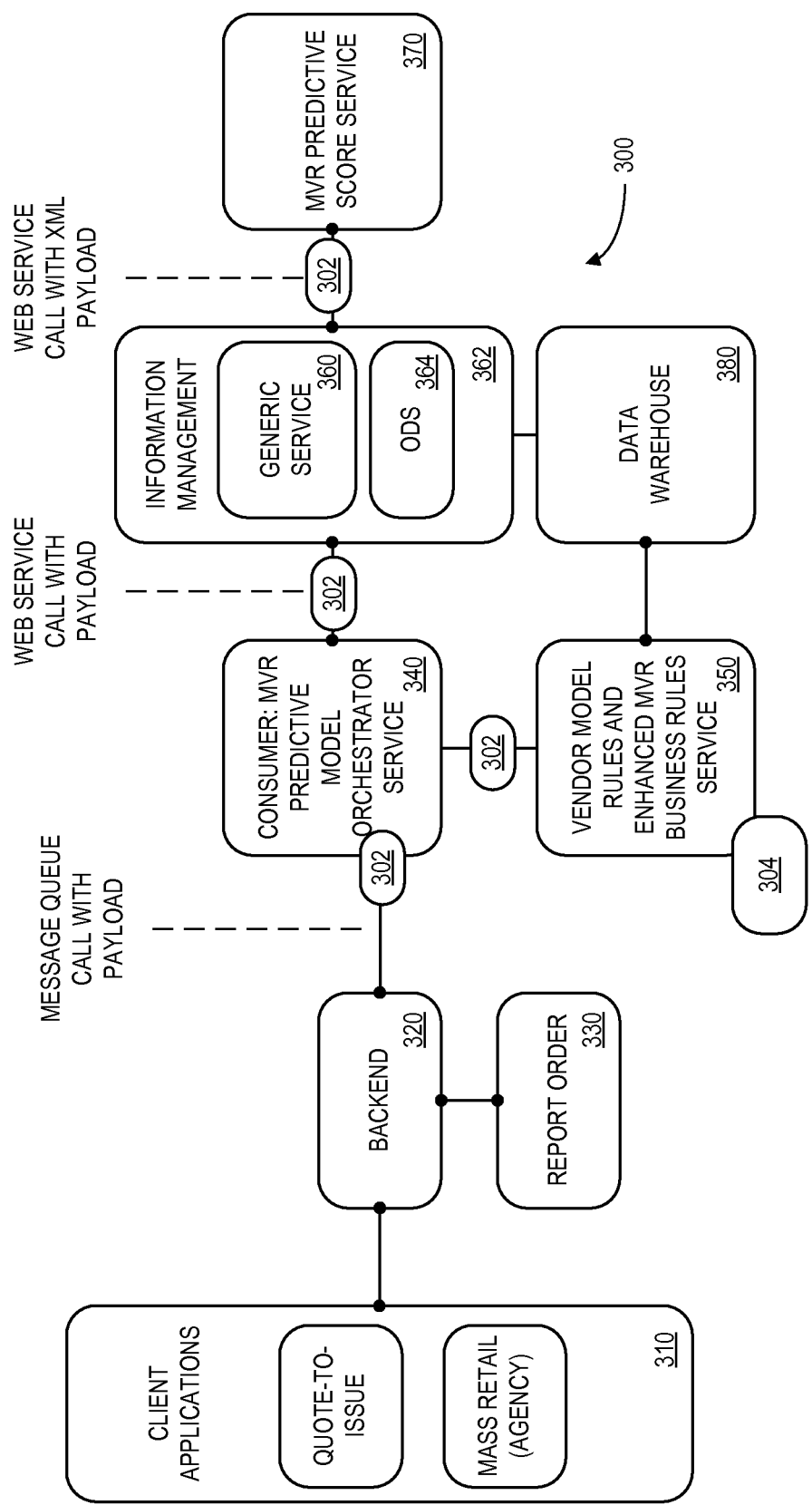
FIG. 3 illustrates a high level system architecture in accordance with some embodiments.

FIG. 3 illustrates a high level system architecture 300 in accordance with some embodiments. The system architecture 300 includes client applications 310, such as a quote-to-issue application, a mass retail (agency) application, etc., that may be used to collect information about new potential automobile insurance policies. The information may be provided to a backend process 320 that interfaces with a report ordering process 330 (e.g., LEXUS-NEXUS® or a similar service) that can be used to order electronic records. The backend process 320 may interface with a consumer platform MVR predictive model orchestrator service 340, passing the appropriate payload to be handled by a consumer platform MVR predictive model orchestrator service 340. According to some embodiments, the backend 320 and orchestrator service 340 may communicate via a hardware device 302, such as a device adapted to facilitate load balancing, performance monitoring, and/or troubleshooting functionality. The MVR predictive model orchestrator service 340 may interface with vendor model rules and an enhanced MVR business rules service 350 and generate a web service call with an appropriate electronic payload. According to some embodiments, the business rules service 350 may operate in connection with a persistence manager 304 adapted to take information processed within a rules service and store which information may be relevant for a report. A generic service with an MVR predictive score service 360 may then issue a web service call with an appropriately formatted (and potentially proprietary) XML payload to an MVR predictive score service 370. The generic score service 360 might, according to some embodiments, be associated with an information management module 362 and/or an Operational Data Store ("ODS") used to store report information. The ultimate result of the decision process may be stored in a data warehouse 380 for later analysis and/or fine tuning of the various models.

Figure 4:
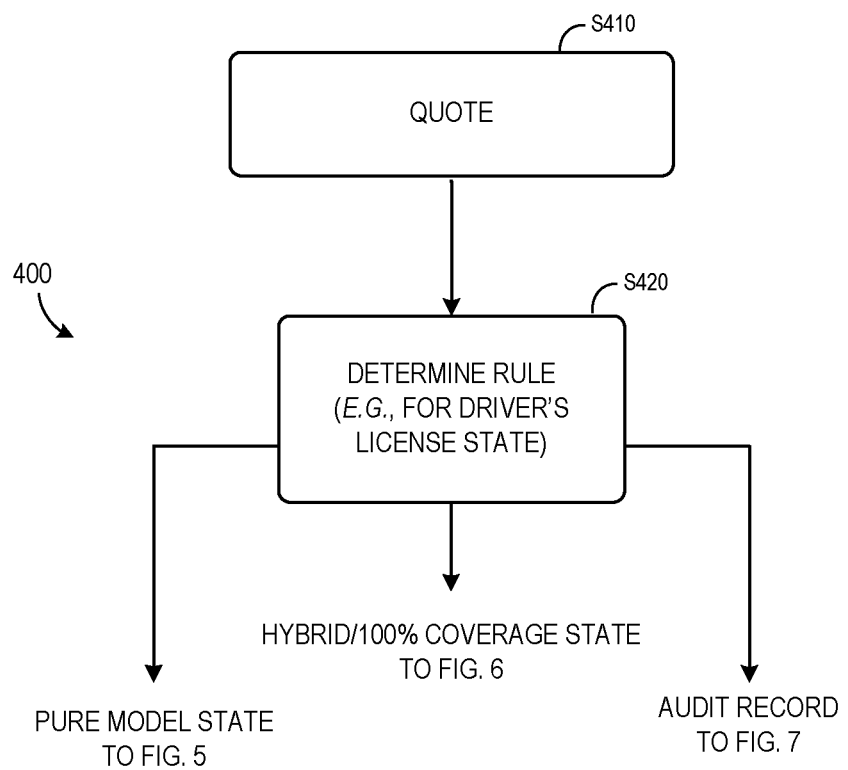
FIGS. 4 through 8 illustrate a method in accordance with some embodiments.

FIGS. 4 through 8 illustrate a method in accordance with some embodiments. In particular, FIG. 4 illustrates a portion 400 of the method wherein quote information is received at S410 and an appropriate rule path is determined at S420 (e.g., based on the geographic state associated with the quote). If it is determined at S420 that the state is a "pure model" state, the process continues at FIG. 5. If it is determined at S420 that the state is a "hybrid" or "100% coverage" state, the process continues at FIG. 6. Finally, if it is determined at S420 that the quote is an "audit record," the process continues at FIG. 7.

Figure 5:
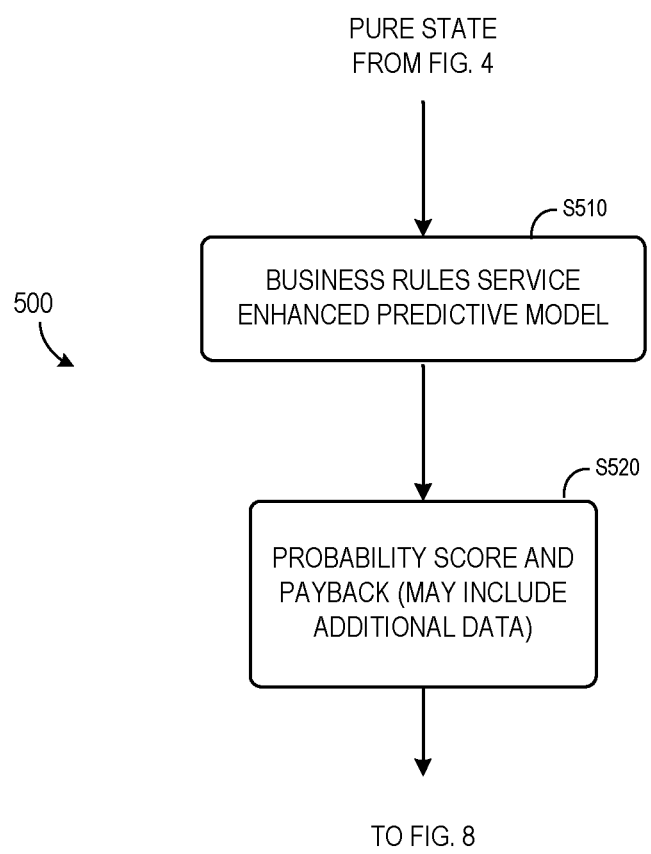

FIG. 5 illustrates a portion 500 of the method when it is determined that a quote is associated with a "pure model" state. At S510, a business rules service and/or an enhanced predictive model might be executed to generate, at S520, a probability score and/or one or more payback values. According to some embodiments, additional data may also be associated with the quote at this point. The process then continues as described with respect to FIG. 8.

Figure 6:
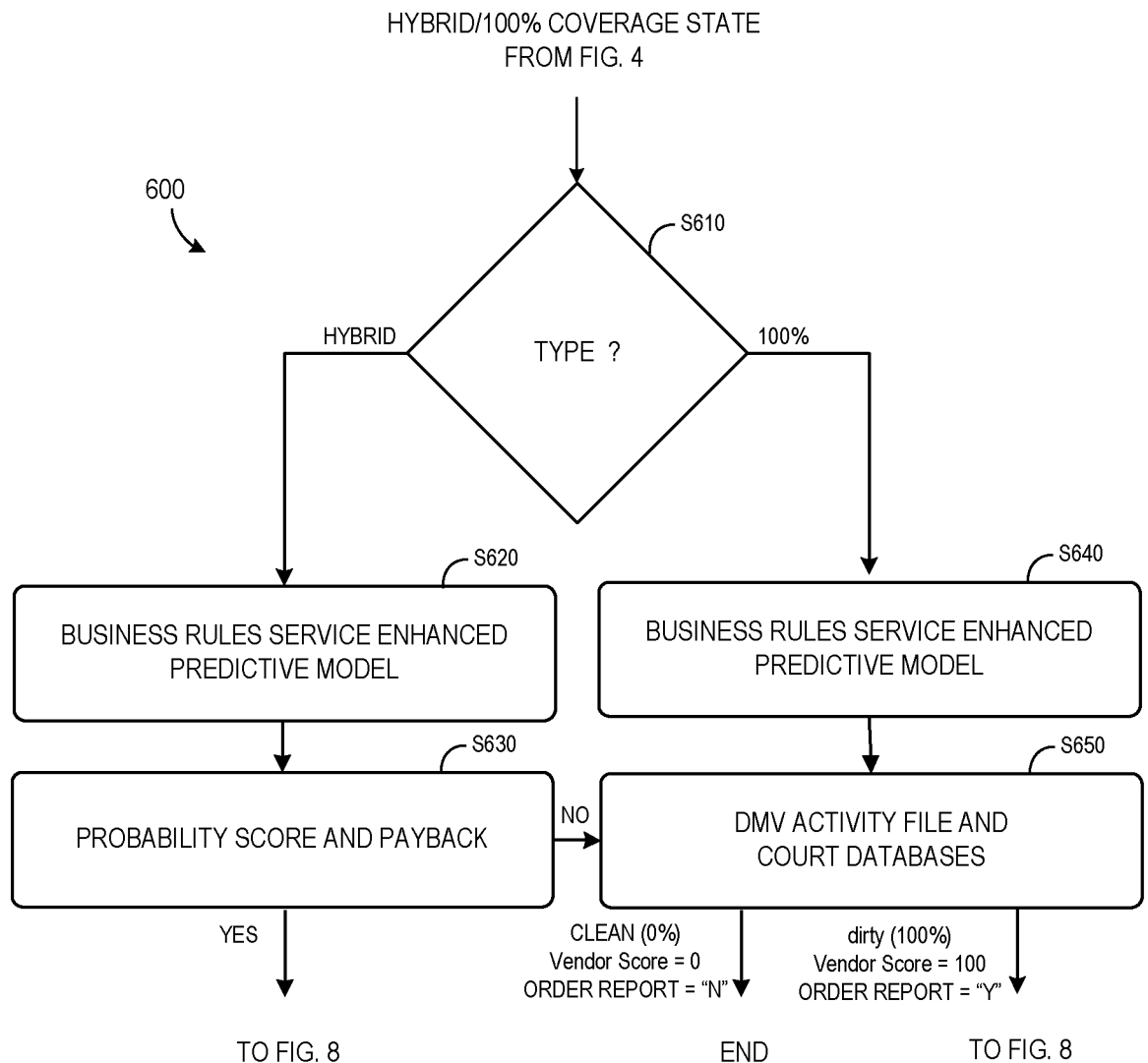

FIG. 6 illustrates a portion 600 of the method when it is determined that a quote is associated with a "hybrid" or "100% coverage" state. If the quote is a hybrid type at S610, a business rules service and/or an enhanced predictive model might be executed at S620 to generate, at S630, a probability score and/or one or more payback values. If these values indicate that an MVR should be ordered ("yes"), the process continues as described with respect to FIG. 8.

If the quote is a 100% type at S610, a business rules service and/or an enhanced predictive model might be executed at S640. DMV activity files may be checked along with one or more court databases at S650 to determine whether the quote is considered "clean" (0%) or "dirty" (100%). These determinations may also be made when the values generated at S630 indicated that an MVR should not be ordered ("no"). If the quote is clean, the process ends (and no report is ordered). Note that by avoiding or "suppressing" the ordering of an electronic record in this way, embodiments may avoid unnecessary costs, data transmissions, delays, etc. for the insurance enterprise. If the quote is dirty, the process then continues as described with respect to FIG. 8 (and the report will be ordered).

Figure 7:
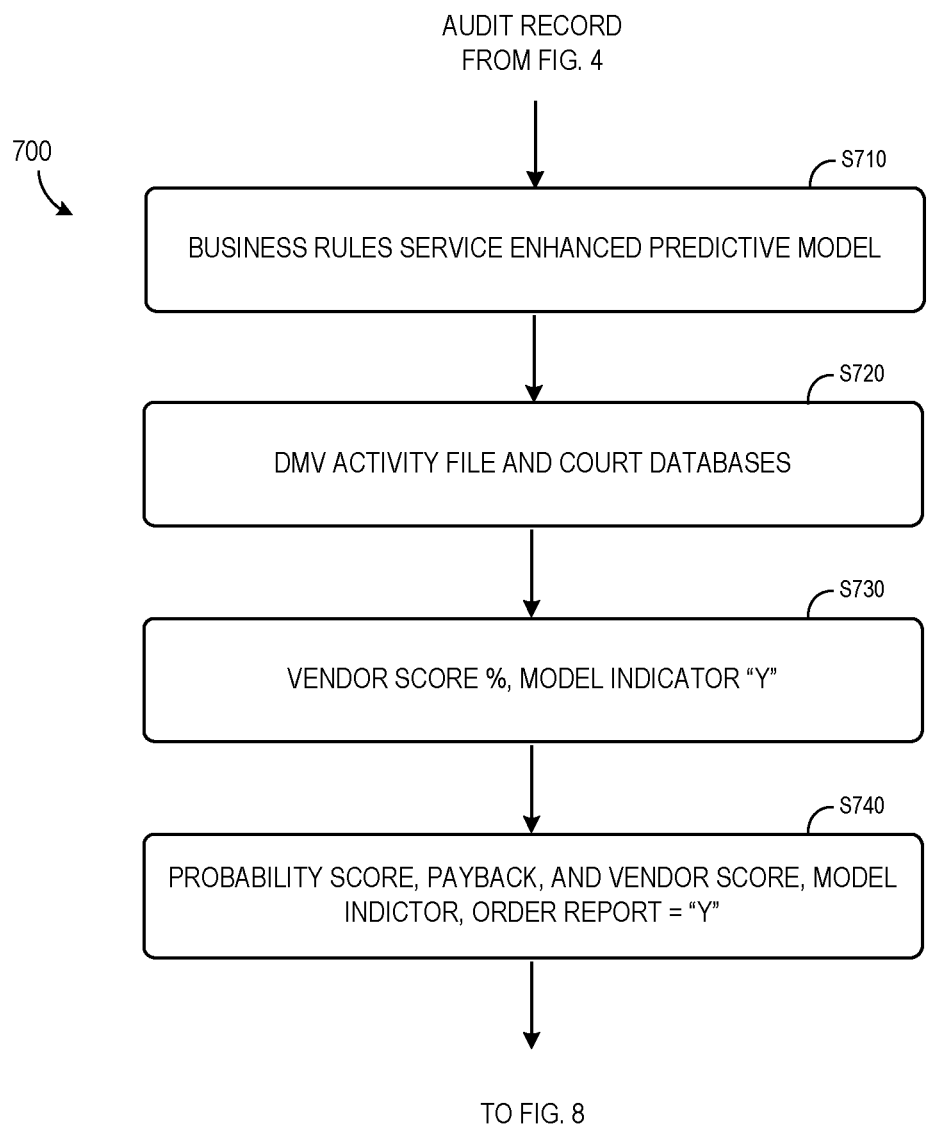

FIG. 7 illustrates a portion 700 of the method when it is determined that a quote is associated with an "audit record." In this case, a business rules service and/or an enhanced predictive model might be executed at S710. DMV activity files may be checked along with one or more court databases at S720 to generate a vendor score percentage at S730. Note that for an audit record, a DMV might always be ordered (to make sure the system is functioning as intended). A probability score, payback values, a vendor score, and/or model results may be generated at S740 before process continues as described with respect to FIG. 8.

Figure 8:
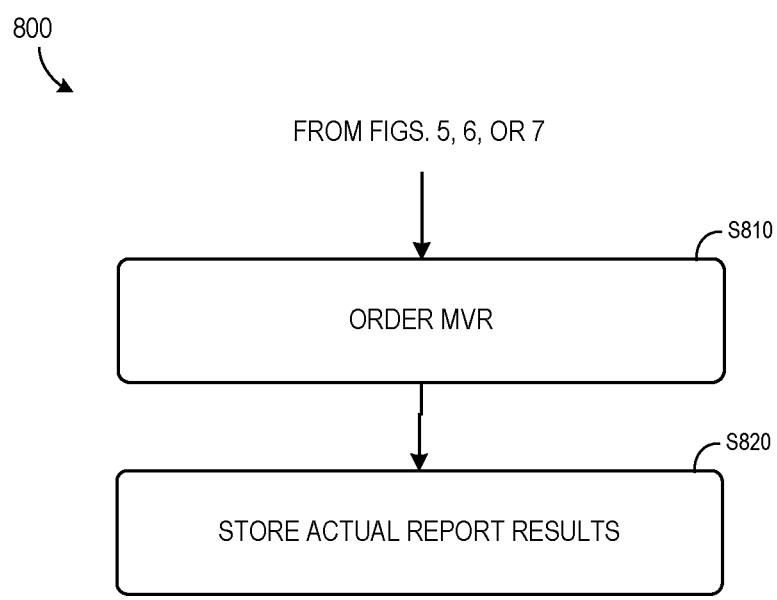

As illustrated in FIG. 8, the method 800 concludes with the ordering of an MVR at S810. For example, a request for an electronic record may be transmitted to a state's Department of Motor Vehicles along with payment of an appropriate fee. The actual report results may then be stored at S820 (e.g., for later review of model performance, premium and underwriting decisions, etc.

Figure 9:
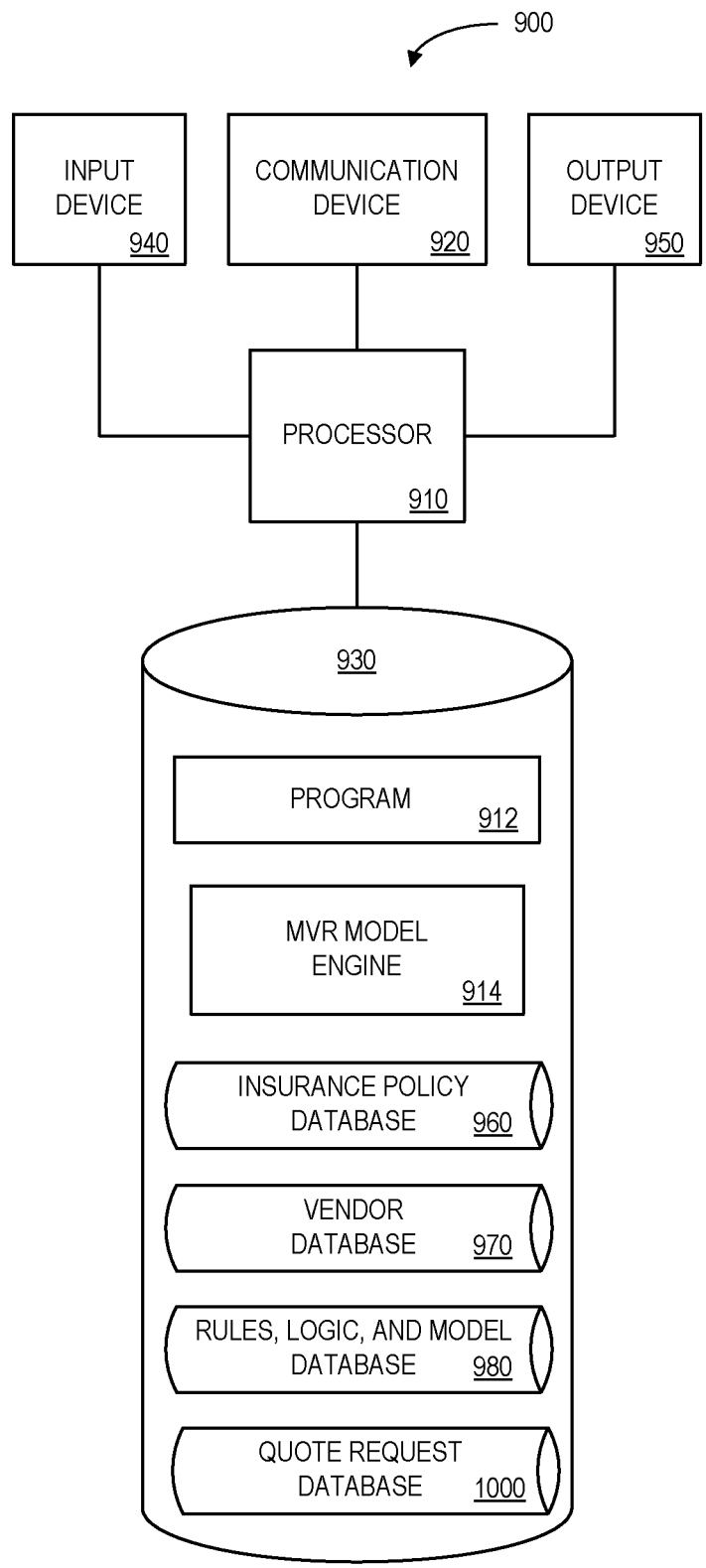
FIG. 9 is block diagram of an apparatus or platform according to some embodiments of the present invention.

The embodiments described herein may be implemented using any number of different hardware configurations. For example, FIG. 9 illustrates an apparatus or platform 900 that may be, for example, associated with the system 100 of FIG. 1. The platform 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more remote vendor hub services, MVR ordering systems, and/or customer service representative devices. Note that communications exchanged via the communication device 920 may utilize security features, such as those between a public internet user and an internal network of the insurance enterprise. The security features might be associated with, for example, web servers, firewalls, and/or PCI infrastructure. The platform 900 further includes an input device 940 (e.g., a mouse and/or keyboard to enter information about business logic and rules) and an output device 950 (e.g., to output leadership reports regarding system administration and/or opportunities).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or an MVR model engine or application 914 for controlling the processor 910. The processor 910 performs instructions of the programs 912, 914, and thereby operates in accordance with any of the embodiments described herein. For example, the processor 910 may receive information about a new potential automobile insurance policy, the insurance enterprise platform including an internal new business Motor Vehicle Record ("MVR") model. The processor 910 may also apply business rules and logic, including a determination of a geographic state associated with the new potential automobile insurance policy, to the information about the new potential automobile insurance policy to determine one of: (i) that the internal new business MVR model will decide if an MVR will be purchased from an appropriate department of motor vehicles, (ii) that a third party MVR model will decide if an MVR will be purchased from the appropriate department of motor vehicles, or (iii) that a hybrid application of the internal new business MVR model and the third party MVR model will decide if an MVR will be purchased from the appropriate department of motor vehicles. The processor 910 may then arrange for a vendor hub service to communicate with a plurality of third party vendor platforms, at least one third party vendor platform including the third party MVR model. In addition, the processor may automatically transmit, via an MVR report ordering platform, an electronic MVR report request to a service in accordance with the insurance enterprise platform business rules and logic decision and applicable model results. Note that, according to some embodiments, the business rules and logic include a determination of a cost of ordering an MVR from the appropriate department of motor vehicles and a comparison of that cost to an algorithm generated predicted payback value for a plurality of drivers and a plurality of vehicles.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as shown in FIG. 9), the storage device 930 includes an insurance policy database 960, a vendor database 970, rules, logic and model database 980, and a quote request database 1000. An example of a database that may be used in connection with the platform 900 will now be described in detail with respect to FIG. 10. Note that the databases described herein are only examples, and additional and/or different information may be stored therein. Moreover, various databases might be split or combined in accordance with any of the embodiments described herein. For example, the vendor database 970 and rules, logic, and model database 980 might be combined and/or linked to each other within the MVR model engine 914.

Figure 10:
FIG. 10 is a tabular portion of a quote request database according to some embodiments.

Referring to FIG. 10, a table is shown that represents the quote request database 1000 that may be stored at the platform 900 according to some embodiments. The table may include, for example, entries identifying requests for insurance quotes that have been processed by an insurance enterprise. The table may also define fields 1002, 1004, 1006, 1008, 1010 for each of the entries. The fields 1002, 1004, 1006, 1008, 1010 may, according to some embodiments, specify: a quote identifier 1002, a state 1004, violation probability*driver payback value data 1006, an MVR cost threshold 1008, and a purchase MVR indication 1010. The quote database 1000 may be created and updated, for example, based on information electrically received from web site, a customer service representative device (e.g., when a customer calls for an insurance quote), etc.

The quote request identifier 1002 may be, for example, a unique alphanumeric code identifying information about a new potential automobile insurance policy that has been received by an insurance enterprise. The state 1004 might represent, for example, the geographic state in which a driver is licensed to drive. The violation probability*driver payback value data 1006 might, for example, be determined based at least in part on information about the driver. For example, the violation probability might be determined after considering the driver's age, gender, marital status, etc. The driver payback value might be determined by an algorithm that multiplies payback factor values for a number of different drivers (e.g., a husband and wife) and/or a number of different vehicles. A final MVR surcharge premium may then be determined by the following formula: violation probability*driver payback value data. The final MVR surcharge premium may then be compared to an MVR cost threshold for the applicable state. If the final MVR surcharge premium is greater than the MVR cost threshold for the applicable state, then the purchase MVR 1010 may be set to "YES." If the final MVR surcharge premium is less than the MVR cost threshold for the applicable state, then the purchase MVR 1010 may be set to "NO."

Figure 11:
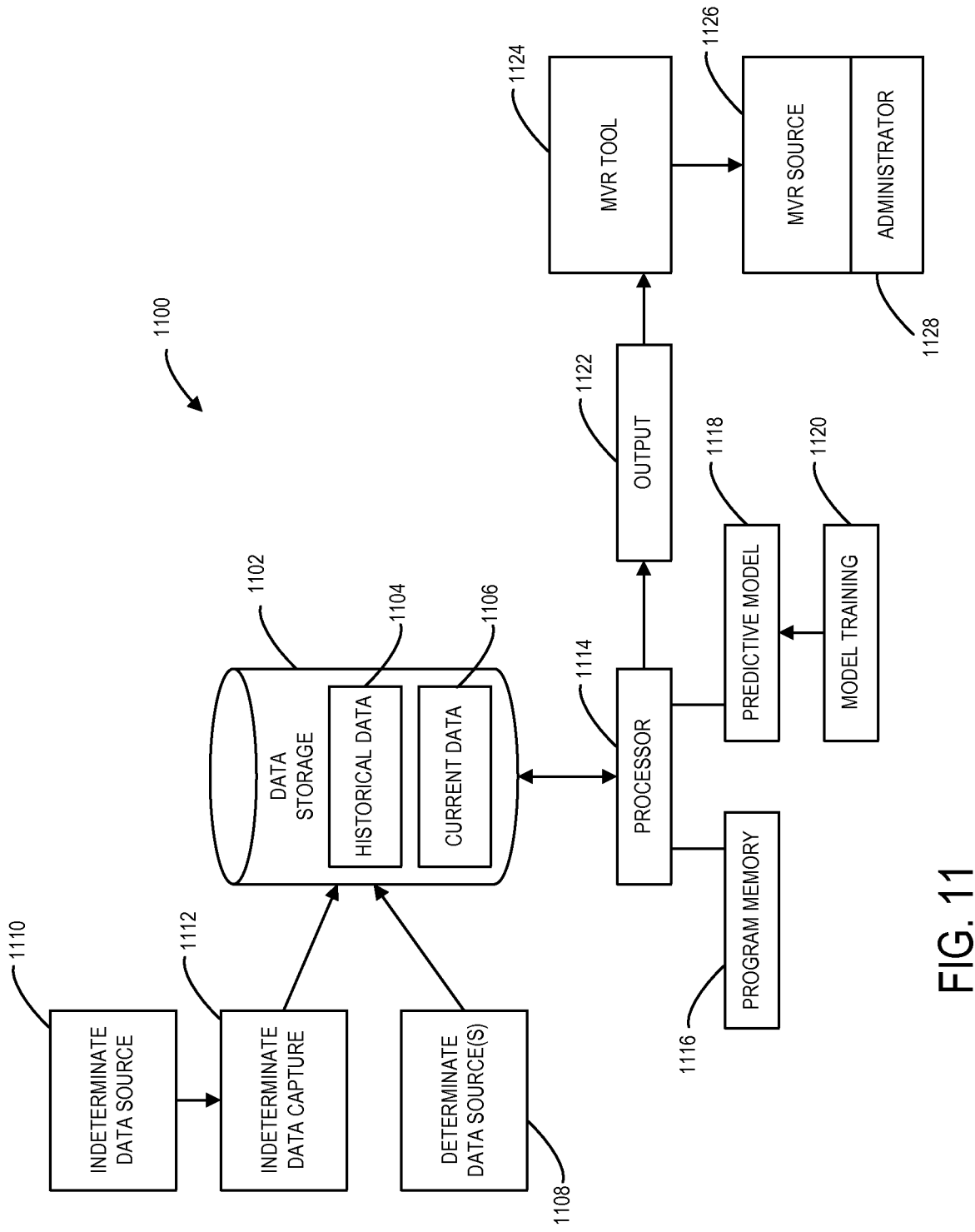
FIG. 11 illustrates a system associated with a predictive model according to some embodiments.

According to some embodiments, one or more predictive models may be used to determine whether or not an electronic record should be ordered. Features of some embodiments associated with a predictive model will now be described by first referring to FIG. 11. FIG. 11 is a partially functional block diagram that illustrates aspects of a computer system 1100 provided in accordance with some embodiments of the invention. For present purposes it will be assumed that the computer system 1100 is operated by an insurance company (not separately shown) for the purpose of supporting an analysis of an insurance quote (and whether or not an MVR should be ordered for the quote).

The computer system 1100 includes a data storage module 1102. In terms of its hardware the data storage module 1102 may be conventional, and may be composed, for example, by one or more magnetic hard disk drives. A function performed by the data storage module 1102 in the computer system 1100 is to receive, store and provide access to both historical transaction data (reference numeral 1104) and current transaction data (reference numeral 1106). As described in more detail below, the historical transaction data 1104 is employed to train a predictive model to provide an output that indicates history data, and the current transaction data 1106 is thereafter analyzed by the predictive model. Moreover, as time goes by, and results become known from processing current transactions, at least some of the current transactions may be used to perform further training of the predictive model. Consequently, the predictive model may thereby adapt itself to changing environments.

Either the historical transaction data 1104 or the current transaction data 1106 might include, according to some embodiments, determinate and indeterminate data. As used herein and in the appended claims, "determinate data" refers to verifiable facts such as the an age of a home; a home type; an event type (e.g., fire or flood); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about a moving violation.

The determinate data may come from one or more determinate data sources 1108 that are included in the computer system 1100 and are coupled to the data storage module 1102. The determinate data may include "hard" data like a customer's name, date of birth, social security number, policy number, address; the date of a speeding ticket; the date an accident was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1110, and may be extracted from raw files or the like by one or more indeterminate data capture modules 1112. Both the indeterminate data source(s) 1110 and the indeterminate data capture module(s) 1112 may be included in the computer system 1100 and coupled directly or indirectly to the data storage module 1102. Examples of the indeterminate data source(s) 1110 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1112 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, customer service representative accident descriptions may be extracted from their narrative text file notes.

The computer system 1100 also may include a computer processor 1114. The computer processor 1114 may include one or more conventional microprocessors and may operate to execute programmed instructions to provide functionality as described herein. Among other functions, the computer processor 1114 may store and retrieve historical claim transaction data 1104 and current claim transaction data 1106 in and from the data storage module 1102. Thus the computer processor 1114 may be coupled to the data storage module 1102.

The computer system 1100 may further include a program memory 1116 that is coupled to the computer processor 1114. The program memory 1116 may include one or more fixed storage devices, such as one or more hard disk drives, and one or more volatile storage devices, such as RAM devices. The program memory 1116 may be at least partially integrated with the data storage module 1102. The program memory 1116 may store one or more application programs, an operating system, device drivers, etc., all of which may contain program instruction steps for execution by the computer processor 1114.

The computer system 1100 further includes a predictive model component 1118. In certain practical embodiments of the computer system 1100, the predictive model component 1118 may effectively be implemented via the computer processor 1114, one or more application programs stored in the program memory 1116, and data stored as a result of training operations based on the historical transaction data 1104 (and possibly also data received from a third party service). In some embodiments, data arising from model training may be stored in the data storage module 1102, or in a separate data store (not separately shown). A function of the predictive model component 1118 may be to determine whether or not an electronic record should be ordered. The predictive model component may be directly or indirectly coupled to the data storage module 1102.

The predictive model component 1118 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1100 includes a model training component 1120. The model training component 1120 may be coupled to the computer processor 1114 (directly or indirectly) and may have the function of training the predictive model component 1118 based on the historical claim transaction data 1104 and/or information about court actions and other types of events. (As will be understood from previous discussion, the model training component 1120 may further train the predictive model component 1118 as further relevant data becomes available.) The model training component 1120 may be embodied at least in part by the computer processor 1114 and one or more application programs stored in the program memory 1116. Thus the training of the predictive model component 1118 by the model training component 1120 may occur in accordance with program instructions stored in the program memory 1116 and executed by the computer processor 1114.

In addition, the computer system 1100 may include an output device 1122. The output device 1122 may be coupled to the computer processor 1114. A function of the output device 1122 may be to provide an output that is indicative of (as determined by the trained predictive model component 1118) a particular electronic record ordering decision. The output may be generated by the computer processor 1114 in accordance with program instructions stored in the program memory 1116 and executed by the computer processor 1114. More specifically, the output may be generated by the computer processor 1114 in response to applying the data for the insurance quote to the trained predictive model component 1118. The output may, for example, be an estimate and/or likelihood within a predetermined range of numbers. In some embodiments, the output device may be implemented by a suitable program or program module executed by the computer processor 1114 in response to operation of the predictive model component 1118.

Still further, the computer system 1100 may include an MVR tool module 1124. The MVR tool module 1124 may be implemented in some embodiments by a software module executed by the computer processor 1114. The MVR tool module 1124 may have the function of rendering a portion of the display on the output device 1122. Thus the MVR tool module 1124 may be coupled, at least functionally, to the output device 1122. In some embodiments, for example, the MVR tool module 1124 may direct workflow by referring, to an MVR source 1126, a record request generated by the predictive model component 1118 and found to be associated with various results or scores. In some embodiments, some report requests may be provided to an administrator 1128 who may monitor and review the performance of the system 1100 as appropriate.

Figure 12:
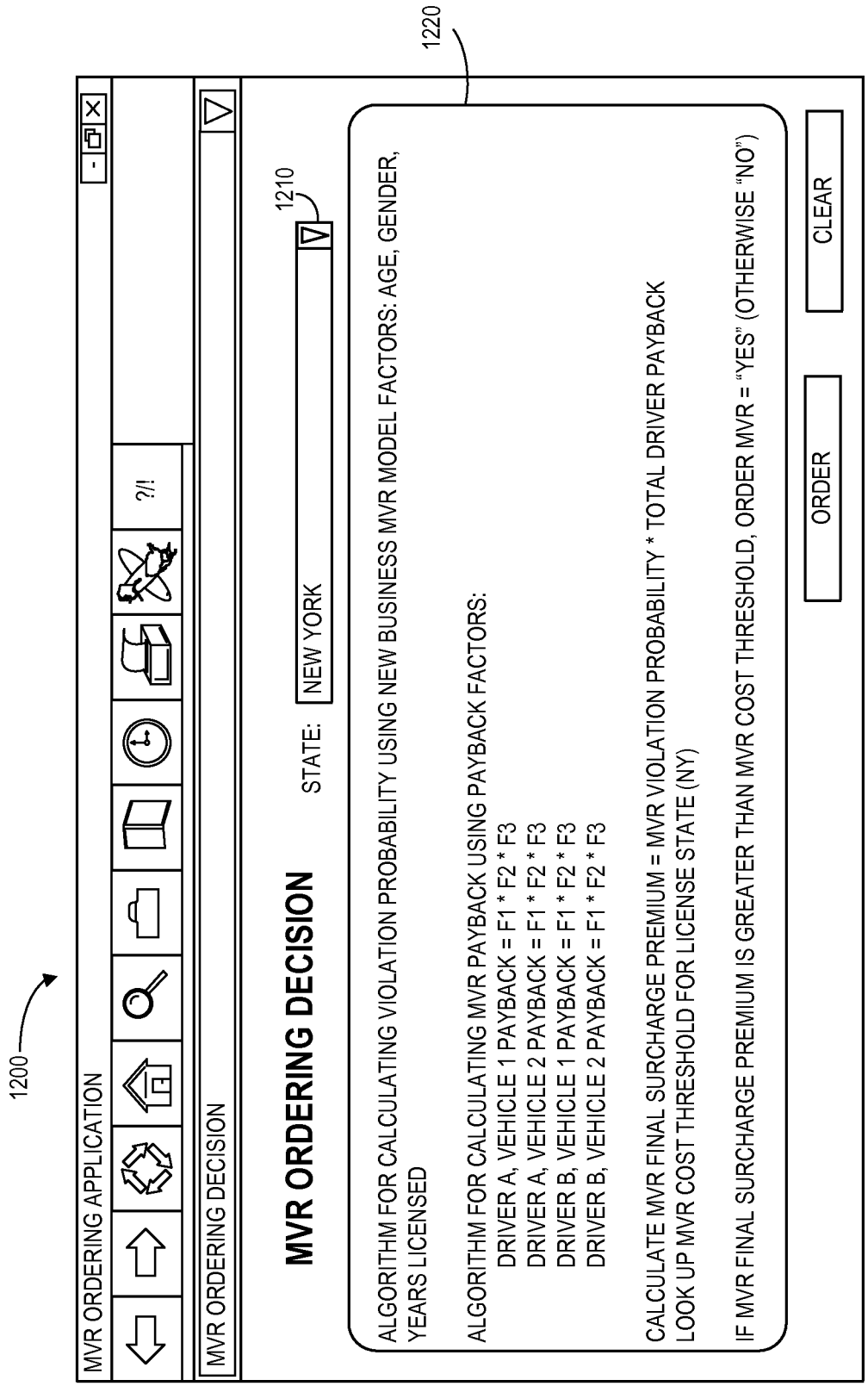
FIG. 12 is an example of an administrator display in accordance with some embodiments.

FIG. 12 is an example of an MVR ordering decision display 1200 according to some embodiments. The display 1200 might, for example, be reviewed by an administrator to verify that the system is operating as intended. The display 1200 includes a geographic state selection area 1210 comprising a drop down list that may be used to select a state in which a driver is licensed. The display 1200 further includes a calculation area 1220 where the details of various algorithms, business rules and logic, model results, etc. may be displayed to the administrator.

Thus, embodiments may provide an automated and efficient way to facilitate an analysis of quote information to automatically determine if an MVR should be ordered. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
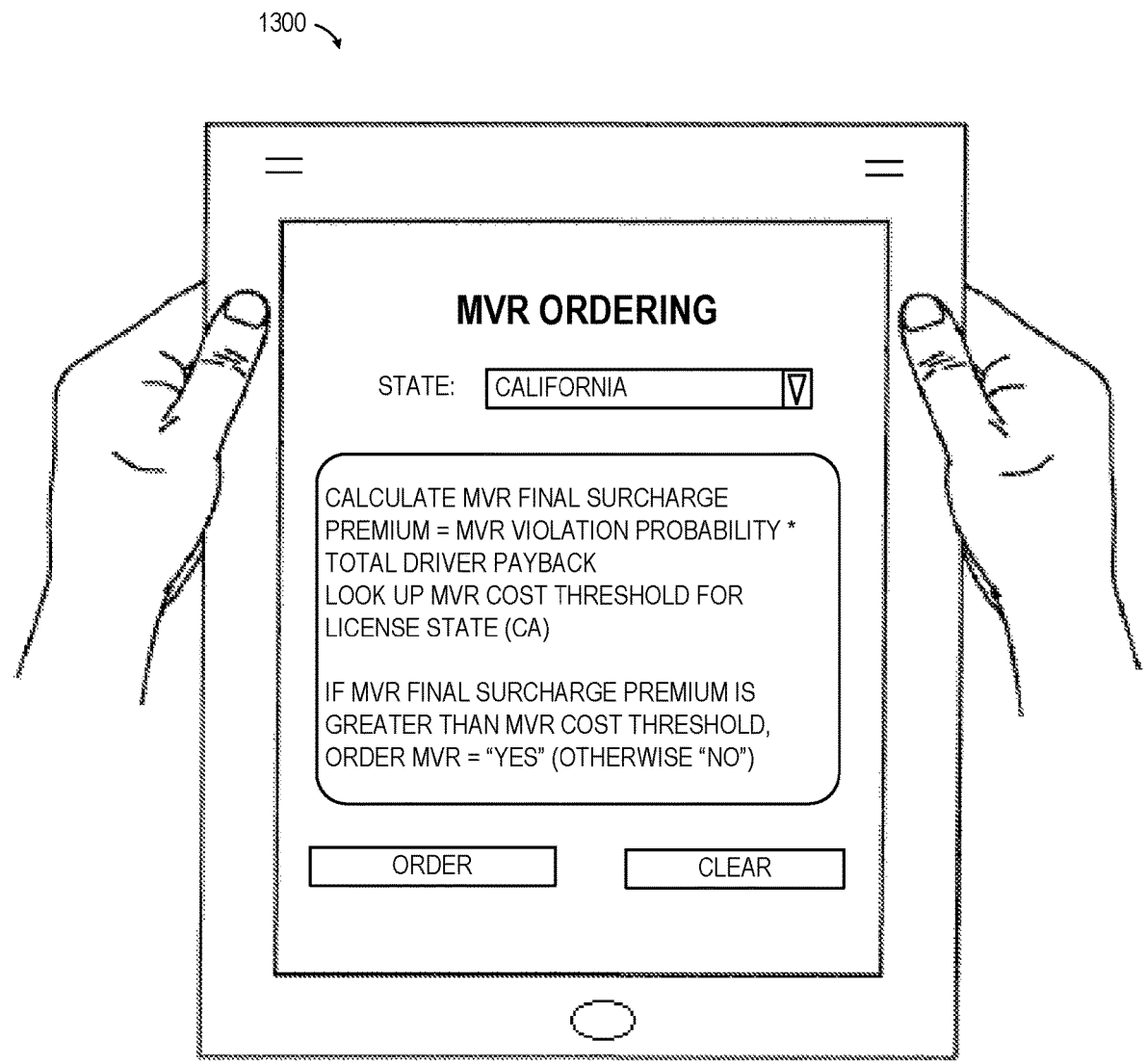
FIG. 13 illustrates a display on a portable device in accordance with some embodiments.

Although specific hardware and data configurations have been described herein, note that any number of other configurations may be provided in accordance with embodiments of the present invention (e.g., some of the information associated with vendor hub service might be included in an insurance enterprise platform). Moreover, although embodiments have been described with respect to automobile insurance, embodiments may instead be associated with insurance connected with boats, motorcycles, snowmobiles, airplanes, truck operators, etc. Still further, the displays and devices illustrated herein are only provided as examples, and embodiments may be associated with any other types of user interfaces. For example, FIG. 13 illustrates a handheld display 1300 according to some embodiments.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to reduce processing time for electronic records associated with an enterprise, comprising:
    an enterprise platform to receive information about a potential electronic record, the enterprise platform including an internal electronic record model;
    a vendor hub service in communication with the enterprise platform and a plurality of third party vendor platforms, at least one third party vendor platform including a third party electronic record model, the vendor hub service being adapted to transmit a web service call that includes an appropriately formatted extensible markup language electronic file payload to a predictive score service,
    wherein the enterprise platform is to apply enterprise rules and logic at least partially generated by a predictive model, including a determination of data about a geographic state associated with the potential electronic record, to the information about the potential electronic record to automatically select of one of three potential decision flows:
        that the internal electronic record model will decide when an electronic record will be requested from a creator of the electronic record,
        that the third party electronic record model will decide when an electronic record will be requested from the creator of the electronic record, or
        that a hybrid application of the internal electronic record model and the third party electronic record model will decide when an electronic record will be requested from the creator of the electronic record,
    wherein execution of the selected decision flow assigns a request flag of "no" to electronic records that will not be requested from the creator of the electronic record and a request flag of "yes" to electronic records that will be requested from the creator of the electronic record; and
    an electronic record requesting platform, coupled to the enterprise platform, to automatically transmit electronic record report requests associated with the "yes" request flag to the creator of the electronic record, without transmitting electronic record report requests associated with the "no" request flag to the creator of the electronic record thereby avoiding transmission of unnecessary information by the enterprise, wherein the enterprise rules and logic include a determination of a cost of requesting an electronic record from the creator of the electronic record and a comparison of that cost to an algorithm generated threshold value that is based at least in part on data received from the predictive score service in response to the web service call, and further wherein future results associated with decisions of the indicated decision flows are used by the predictive model to update the enterprise rules and logic.

2. The system of claim 1, wherein the information about the potential electronic record is associated with a new potential automobile insurance policy and includes at least one of: (i) a driver gender, (ii) a driver age, (iii) an indication of whether the driver is a principle operator of a motor vehicle, (iv) a number of vehicles, (v) a number of drivers, (vi) a marital status, (vii) an insurance score, (viii) a number of years licensed, and (ix) an indication of whether the driver is a student.

3. The system of claim 1, wherein the information about the potential electronic record is associated with a new potential automobile insurance policy and is associated with at least one of: (i) a quote for a new potential customer, (ii) a renewal of an existing automobile insurance policy, (iii) a personal automobile insurance policy, and (iv) a commercial automobile insurance policy.

4. The system of claim 1, wherein at least one of the internal electronic record model and the third party electronic record model are associated with a probability score.

5. The system of claim 1, wherein at least one of the internal electronic record model and the third party electronic record model are associated with a vendor score.

6. A computerized method to reduce processing time for electronic records associated with an enterprise, comprising:
receiving, at an enterprise platform, information about a potential electronic record, the enterprise platform including an internal electronic record model;
exchanging, by a vendor hub service, information with a plurality of third party vendor platforms, including at least one third party platform that includes a third party electronic record model;
transmitting, by the vendor hub service, a web service call that includes an appropriately formatted extensible markup language electronic file payload to a predictive score service;
applying, by the enterprise platform, enterprise rules and logic at least partially generated by a predictive model, including a determination of information about a geographic state associated with the potential electronic record, to the information about the potential electronic record to automatically select one of three potential decision flows:
that the internal electronic record model will decide when an electronic record will be requested from a creator of the electronic record,
that the third party electronic record model will decide when an electronic record will be requested from the creator of the electronic record, or
that a hybrid application of the internal electronic record model and the third party electronic record model will decide when an electronic record will be requested from the creator of the electronic record,
wherein execution of the selected decision flow assigns a request flag of "no" to electronic records that will not be requested from the creator of the electronic record and a request flag of "yes" to electronic records that will be requested from the creator of the electronic record; and
automatically transmitting from an electronic record requesting platform electronic record report requests associated with the "yes" request flag to the creator of the electronic record, without transmitting electronic record report requests associated with the "no" request flag to the creator of the electronic record thereby avoiding transmission of unnecessary information by the enterprise,
wherein the enterprise rules and logic include a determination of a cost of requesting an electronic record from the creator of the electronic record and a comparison of that cost to an algorithm generated threshold value that is based at least in part on data received from the predictive score service in response to the web service call, and further wherein future results associated with decisions of the indicated decision flows are used by the predictive model to update the enterprise rules and logic.

7. The method of claim 6, wherein the information about the potential electronic record includes at least one of: (i) a driver gender, (ii) a driver age, (iii) an indication of whether the driver is a principle operator of a motor vehicle, (iv) a number of vehicles, (v) a number of drivers, (vi) a marital status, (vii) an insurance score, (viii) a number of years licensed, and (ix) an indication of whether the driver is a student.

8. The method of claim 6, wherein the information about the potential electronic record is associated with at least one of: (i) a quote for a new potential customer, (ii) a renewal of an existing automobile insurance policy, (iii) a personal automobile insurance policy, and (iv) a commercial automobile insurance policy.

9. The method of claim 6, wherein at least one of the internal electronic record model and the third party electronic record model are associated with a probability score.

10. The method of claim 6, wherein at least one of the internal electronic record model and the third party electronic record model are associated with a vendor score.

11. A non-transitory, computer-readable medium storing instructions that, when executed by a computer processor, cause the computer processor to perform a method to reduce processing time for electronic records associated with an enterprise, the method comprising:
receiving, at an enterprise platform, information about a potential electronic record, the enterprise platform including an internal electronic record model;
exchanging, by a vendor hub service, information with a plurality of third party vendor platforms, including at least one third party platform that includes a third party electronic record model;
transmitting, by the vendor hub service, a web service call that includes an appropriately formatted extensible markup language electronic file payload to a predictive score service;
applying, by the enterprise platform, enterprise rules and logic at least partially generated by a predictive model, including a determination of information about a geographic state associated with the potential electronic record, to the information about the potential electronic record to automatically select one of three potential decision flows:
that the internal electronic record model will decide when an electronic record will be requested from a creator of the electronic record, that the third party electronic record model will decide when an electronic record will be requested from the creator of the electronic record, or that a hybrid application of the internal electronic record model and the third party electronic record model will decide when an electronic record will be requested from the creator of the electronic record, wherein execution of the selected decision flow assigns a request flag of "no" to electronic records that will not be requested from the creator of the electronic record and a request flag of "yes" to electronic records that will be requested from the creator of the electronic record; and automatically transmitting from an electronic record requesting platform electronic record report requests associated with the "yes" request flag to the creator of the electronic record, without transmitting electronic record report requests associated with the "no" request flag to the creator of the electronic record thereby avoiding transmission of unnecessary information by the enterprise, wherein the enterprise rules and logic include a determination of a cost of requesting an electronic record from the creator of the electronic record and a comparison of that cost to an algorithm generated threshold value that is based at least in part on data received from the predictive score service in response to the web service call, and further wherein future results associated with decisions of the indicated decision flows are used by the predictive model to update the enterprise rules and logic.

12. The medium of claim 11, wherein the information about the potential electronic record includes at least one of: (i) a driver gender, (ii) a driver age, (iii) an indication of whether the driver is a principle operator of a motor vehicle, (iv) a number of vehicles, (v) a number of drivers, (vi) a marital status, (vii) an insurance score, (viii) a number of years licensed, and (ix) an indication of whether the driver is a student.

13. The medium of claim 11, wherein the information about the potential electronic record is associated with at least one of: (i) a quote for a new potential customer, (ii) a renewal of an existing automobile insurance policy, (iii) a personal automobile insurance policy, and (iv) a commercial automobile insurance policy.

14. The medium of claim 11, wherein at least one of the internal electronic record model and the third party electronic record model are associated with a probability score.

15. The medium of claim 11, wherein at least one of the internal electronic record model and the third party electronic record model are associated with a vendor score.

* * * * *